(12) United States Patent
Engel et al.

(10) Patent No.: US 7,178,555 B2
(45) Date of Patent: Feb. 20, 2007

(54) PRESSURE RELIEF VALVE

(75) Inventors: Roger K. Engel, Schaumburg, IL (US); Dave Carroll, Bensenville, IL (US)

(73) Assignee: Plitek, LLC, Des Plaines, IL (US)

( * ) Notice: Subject to any disclaimer, the term of this patent is extended or adjusted under 35 U.S.C. 154(b) by 0 days.

(21) Appl. No.: 10/607,857

(22) Filed: Jun. 27, 2003

(65) Prior Publication Data
US 2004/0050437 A1 Mar. 18, 2004

Related U.S. Application Data

(63) Continuation-in-part of application No. 09/705,524, filed on Nov. 3, 2000, now abandoned.

(51) Int. Cl.
*F16K 15/14* (2006.01)
*B65D 77/22* (2006.01)
*B65D 33/01* (2006.01)

(52) U.S. Cl. .............. 137/852; 137/843; 220/89.1; 383/103; 426/118

(58) Field of Classification Search ............... 137/843, 137/859, 852; 220/89.1; 383/103; 426/118
See application file for complete search history.

(56) References Cited

U.S. PATENT DOCUMENTS

| | | | | |
|---|---|---|---|---|
| 4,000,846 A | * | 1/1977 | Gilbert | 383/103 |
| 4,206,870 A | * | 6/1980 | DeVries | 383/103 |
| 5,263,777 A | * | 11/1993 | Domke | 383/103 |
| 5,584,409 A | * | 12/1996 | Chemberlen | 220/89.1 |
| 5,727,881 A | * | 3/1998 | Domke | 383/103 |
| 5,782,266 A | * | 7/1998 | Domke | 137/551 |
| 5,881,881 A | * | 3/1999 | Carrington | 206/524.8 |
| 5,989,608 A | * | 11/1999 | Mizuno | 426/113 |

* cited by examiner

*Primary Examiner*—Ramesh Krishnamurthy
(74) *Attorney, Agent, or Firm*—Niro, Scavone, Haller & Niro

(57) ABSTRACT

A pressure relief valve that is mountable to protect packaging so as to vent pressurized gases contained within the packaging. The present invention also pertains to a pressure relief valve which includes at least one passageway defined by at least one inner rail and which is in communication with an aperture.

8 Claims, 1 Drawing Sheet

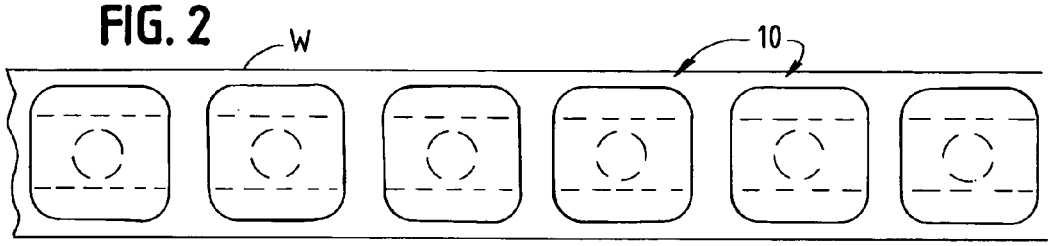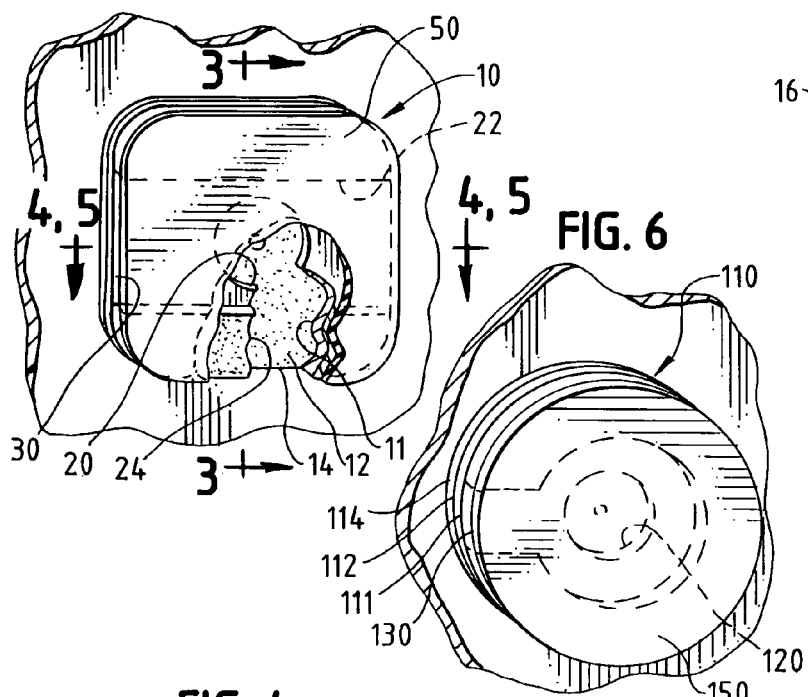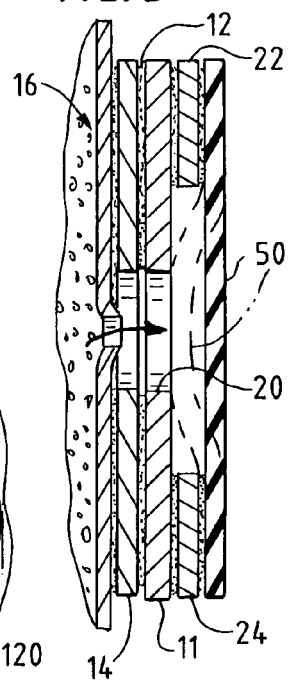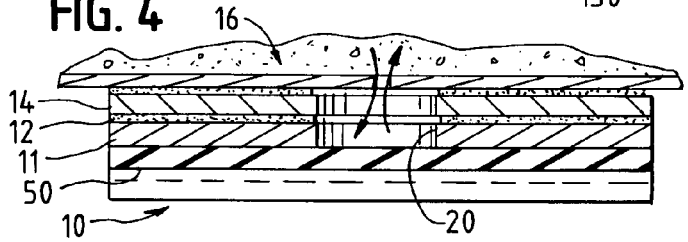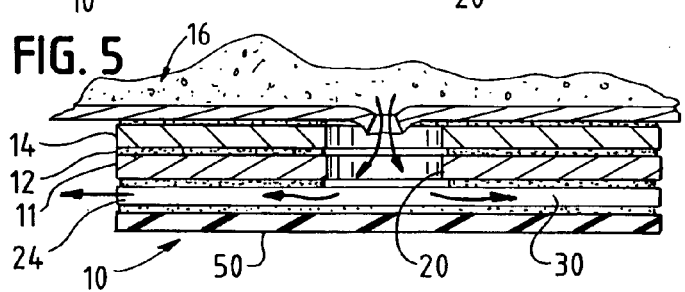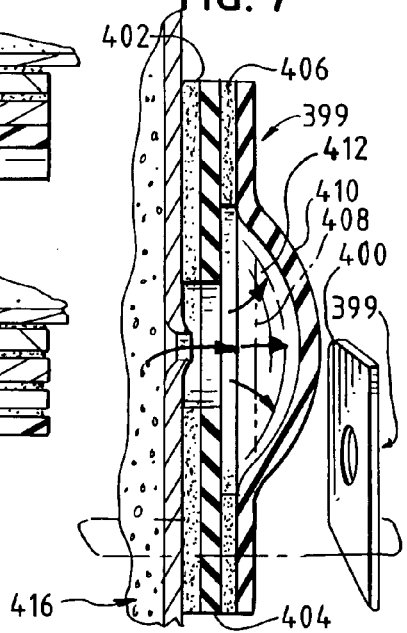

PRESSURE RELIEF VALVE

This application is a continuation-in-part of application Ser. No.: 09/705,524, filed Nov. 3, 2000, now abandoned.

BACKGROUND OF THE INVENTION

The present invention relates to a pressure relief valve that is mountable to product packaging so as to vent pressurized gasses contained within the packaging. More specifically, the present invention is a pressure relief valve which includes at least one passageway defined by at least one inner rail and which is in communication with an aperture.

SUMMARY OF THE INVENTION

Pressure relief valves are often used to vent product packaging which contains materials which may produce gasses. In flexible wall packaging or containers, a build-up of gasses within the container often distorts the appearance of the product or damages the packaging, among other things. To prevent excessive pressure from building within the container, a pressure relief valve is used to vent the gasses while also sealing the contents from the environment through the use of a flexible film or membrane.

However, in use, and especially when numerous cartons are packaged together in bulk, the operation of the film is often obstructed or impeded by an adjoining carton which is placed in contact with the membrane or film. To solve this problem, outer rails are often used which prevent an object from physically contacting the flexible film. This, of course, leads to use of additional materials, manufacturing steps, and ultimately, increased costs.

The present invention eliminates the use of outer rails through the use of at least one inner rail that defines a passageway which is recessed from an aperture located on the valve. In a closed position, the film covers the aperture, and in an open position, the film is raised above the aperture to permit the aperture to be in communication with the passageway in order to vent the container.

DESCRIPTION OF THE DRAWINGS

These and other features, objects and advantages of the present invention will become apparent from the following description and drawings wherein like reference numerals represent like elements in several views, and in which:

FIG. 1 is a perspective view of a first exemplary embodiment of the invention.

FIG. 2 shows how pressure relief valves may be formed on rolls.

FIG. 3 is a cross sectional view taken along line 3—3.

FIG. 4 is a cross sectional view taken along line 4—4.

FIG. 5 is another cross sectional view taken along line 4—4.

FIG. 6 is a perspective view of an alternative embodiment of the present invention.

FIG. 7 illustrates an alternate embodiment of the present invention.

DESCRIPTION OF THE PREFERRED EMBODIMENTS

Set forth below is a description of what are currently believed to be the preferred embodiments or best examples of the invention claimed. Future and present alternatives and modifications to the preferred embodiments are contemplated. Any alternates or modifications having insubstantial changes in function, in purpose, in structure or in result are intended to be covered by the claims of this patent.

As shown in FIG. 1, one embodiment of the present invention includes a pressure relief valve 10 having a base 11 which may include an adhesive layer 12 and a release liner 14. The adhesive layer 12 allows the base to be mounted to a package or support surface 16.

An aperture 20 is included on base 11 which is often located over an opening on package 16. Base 11 may be made of a number of materials known to those of skill in the art including Polyethylene Terephthalate by DuPont Teijin Films.

As is also shown in FIGS. 1–5, inner rails 22 and 24 are provided on base 11. Inner rails 22 and 24 may be an adhesive layer that has been applied to the base or of some other suitable material known to those of skill in the art. The thickness of the inner rails should be about 1 to 10 millimeters, with a thickness of 4–6 millimeters being preferred.

The inner rails are located a spaced distance from aperture 20 to form a passageway 30 which is recessed from aperture 20. As show in FIG. 6, in another embodiment of the present invention, a single inner rail 135 may also be provided which forms a passageway 130 that is recessed from aperture 20. Of course, the shape of base 111 may be generally circular or oval as shown in FIG. 6 or 4-sided as shown in FIG. 1. In addition, other shapes would work as well.

A film or membrane 50 or 150 is also provided which is supported by inner rail 135 or inner rails 22 and 24. The film may be made of Polyethylene Terephthalate by DuPont. In addition, a plurality of pressure relief valves 10 may be formed on a roll 60 as shown in FIG. 2 in a manner known to those of ordinary skill in the art.

In operation, as shown in FIG. 3, film 50 is in a closed position and extends inwardly to cover aperture 20. In this position, film 50 acts as a seal which prevents exposure to the outside environment.

To vent the contents, film 50 moves into an open position through the force created by the pressurized gas located in container 16. The pressure moves film 50 up off of aperture 20. This, in turn, permits aperture 20 to be in communication with the passageway so as to allow venting to occur. Once the pressure in the package equalizes, film 50, again, moves inwardly to cover and seal off the aperture.

As is also shown in FIG. 3, in an open position, the passageway and aperture form an opening that is stepped in configuration which permits venting to occur. By permitting film 50 to move downwardly and upwardly within space defined by the passageway, contact by extraneous surfaces or objects with film 50 will not interfere with the operation of valve 50. This, in turn, eliminates the need to use outer rails with the device.

As shown in FIG. 7, an alternate embodiment of the present invention concerns a valve 399 which includes a release liner 400, adhesive 402, base 404, and an elastomeric film 408 which is attached to base 404 by adhesive 406. As described above, this embodiment forms a channel or passageway 412 as well. However, by using an elastomeric film 408, the size of channel 412 may be increased by the ability of the film to balloon outwardly 410 past base 404 when subject to pressure created by outflowing gas. In other words, when in an open position, said film is arcuate or curved in shape. This ability to create a larger than normal passageway 412 allows the valve to handle sudden high flow volumes of air or other gasses that may be encountered. This prevents the container from rupturing when subjected to this condition. A suitable elastomeric film 408 is Exxon 318.92

EVA LD. Of course, other expandable films known to those of ordinary skill in the art maybe used as well. The operation of this embodiment is otherwise as was described above.

While the invention has been described with reference to the preferred embodiments thereof, it will be appreciated that numerous variations, modifications, and alternate embodiments are possible, and accordingly, all such variations, modifications, and alternate embodiments are to be regarded as being within the spirit and scope of the invention.

It should be understood that various changes and modifications to the preferred embodiments described would be apparent to those skilled in the art. Changes and modifications can be made without departing from the spirit and scope of the present invention and without diminishing its intended advantages. It is, therefore, intended that such changes and modifications be covered by the following claims.

What is claimed is:

1. A pressure relief valve comprising: a self-supporting base mountable to a support surface and having a first layer defining an inner aperture; an inner rail member having a different configuration than said self-supporting base, wherein said inner rail member is positioned on the self-supporting base and connected by an adhesive layer to said self-supporting base: a flexible film connected with adhesive to the inner rail member, the flexible film being disposed on the periphery of the valve; said inner rail member defining a passageway between the flexible film and the base recessed from said inner aperture and in communication with said inner aperture; said flexible film moveable between an open and closed position; in said open position said flexible film is located above said aperture and extends outwardly beyond said base; and in said closed position, said film covers said aperture, the inner rail member has a sufficient thickness to permit said flexible film to move from said open position wherein said flexible film does not contact said self-supporting base and to said closed position wherein said flexible film does contact said self-supporting base.

2. The device of claim 1 wherein said flexible film is curved in shape when in said open position.

3. The device of claim 1 wherein said flexible film comprises an elastomeric material.

4. The device of claim 1 wherein said film balloons outwardly when in said open position.

5. The pressure relief valve of claim 1, wherein said inner rail member comprises a pair of strips located along an outer edge of the base.

6. The pressure relief valve of claim 5, wherein said inner rail member forms a rectangular passage that connects to the inner aperture.

7. The pressure relief valve of claim 1, wherein the base comprises Polyethylene Terephthalate.

8. The pressure relief valve of claim 7, wherein the inner rail member has a uniform thickness between 1–10 millimeters.

* * * * *